(12) United States Patent
Adams, IV

(10) Patent No.: US 8,480,045 B2
(45) Date of Patent: Jul. 9, 2013

(54) SLOTTED SUCTION CUP WITH TRANSVERSE BORE AND HOLDING DEVICE

(75) Inventor: William E. Adams, IV, Zelienople, PA (US)

(73) Assignee: Adams Mfg. Corp., Portersville, PA (US)

( * ) Notice: Subject to any disclaimer, the term of this patent is extended or adjusted under 35 U.S.C. 154(b) by 1625 days.

(21) Appl. No.: 11/082,486

(22) Filed: Mar. 17, 2005

(65) Prior Publication Data

US 2006/0208142 A1 Sep. 21, 2006

(51) Int. Cl.
A45D 42/14 (2006.01)
F16B 47/00 (2006.01)

(52) U.S. Cl.
USPC ............... 248/206.2; 248/363; 248/205.5; 248/309.3; 248/467

(58) Field of Classification Search
USPC ........ 403/83, 84, 103, 104, 106, 107; 40/597; 211/99–100; 248/324, 339–341, 206.2, 363, 248/205.5, 205.6, 309.3, 467, 683
See application file for complete search history.

(56) References Cited

U.S. PATENT DOCUMENTS

| | | | |
|---|---|---|---|
| 435,696 A | 9/1890 | Hoffmann | |
| 1,483,640 A * | 2/1924 | Manning | 248/206.3 |
| 1,762,628 A * | 6/1930 | Hoyns | 211/110 |
| 1,772,439 A * | 8/1930 | Garbs | 248/205.5 |
| 1,781,072 A * | 11/1930 | Neidhammer | 248/341 |
| 1,859,893 A * | 5/1932 | Ritz-Woller | 248/542 |
| 2,131,224 A * | 9/1938 | Kaack | 248/206.1 |
| 2,143,783 A * | 1/1939 | Liebman | 182/110 |
| 2,145,142 A * | 1/1939 | Stout | 248/205.5 |
| 2,182,587 A * | 12/1939 | Hudson | 248/341 |
| 2,309,121 A * | 1/1943 | Keely | 248/206.1 |
| 2,502,714 A | 4/1950 | Garnett | |
| 2,638,296 A * | 5/1953 | Battle | 248/105 |
| 2,684,226 A * | 7/1954 | Sundell et al. | 248/294.1 |
| D174,366 S | 3/1955 | Ziskind | |
| 2,743,895 A * | 5/1956 | Tygh | 248/341 |
| 2,886,277 A * | 5/1959 | Boham et al. | 248/205.5 |
| 3,190,599 A * | 6/1965 | Margulis | 248/205.3 |
| 3,237,330 A * | 3/1966 | Dinstbir | 40/593 |
| D260,860 S * | 9/1981 | Doman | D10/110 |
| 4,506,408 A | 3/1985 | Brown | |
| 4,566,570 A | 1/1986 | Geisthoff | |
| 4,588,153 A * | 5/1986 | Boston et al. | 248/74.2 |

(Continued)

OTHER PUBLICATIONS

Japanese Suction Cups Catalogue, received Dec. 13, 1990.

*Primary Examiner* — Terrell McKinnon
*Assistant Examiner* — Michael McDuffie
(74) *Attorney, Agent, or Firm* — Buchanan Ingersoll & Rooney PC (57) ABSTRACT

A suction cup has a generally cylindrical neck integral with and extending outwardly from the cup portion outer surface. The neck is formed of a pair of legs separated by a slot opening to an exposed end of the neck. The neck also has a transverse bore passing through the legs along an axis that intersects the slot. Preferably the axis is normal to the slot. The suction cup may have a support or hook having a curved portion. The hook or support has a straight portion and a cross member attached to the straight portion. At least part of the straight portion is within the slot of the suction cup and at least part of the cross member is within the bore.

11 Claims, 6 Drawing Sheets

U.S. PATENT DOCUMENTS

| | | | | |
|---|---|---|---|---|
| 4,699,279 A | 10/1987 | Spira | | |
| 4,901,960 A * | 2/1990 | Gary | | 248/205.3 |
| 4,951,909 A * | 8/1990 | Russo et al. | | 248/206.2 |
| 4,962,907 A * | 10/1990 | Gary | | 248/205.3 |
| 5,029,786 A * | 7/1991 | Wu | | 248/205.7 |
| D322,554 S * | 12/1991 | Amussen | | D8/373 |
| 5,078,356 A * | 1/1992 | Adams | | 248/206.2 |
| 5,110,078 A * | 5/1992 | Gary | | 248/206.2 |
| 5,133,524 A * | 7/1992 | Liu | | 248/205.8 |
| 5,176,347 A * | 1/1993 | Rouail | | 248/206.2 |
| 5,176,357 A * | 1/1993 | Hobart, II | | 248/683 |
| 5,253,393 A * | 10/1993 | Levin | | 24/301 |
| 5,313,734 A | 5/1994 | Roberts | | |
| 5,318,262 A * | 6/1994 | Adams | | 248/205.8 |
| 5,323,996 A | 6/1994 | Rendall | | |
| 5,402,974 A * | 4/1995 | Adams | | 248/205.5 |
| 5,423,466 A * | 6/1995 | Moon | | 224/324 |
| 5,478,101 A * | 12/1995 | Roberson | | 280/477 |
| 5,483,916 A * | 1/1996 | Kolvites et al. | | 116/173 |
| 5,562,269 A * | 10/1996 | Protz, Jr. | | 248/74.2 |
| 5,582,488 A | 12/1996 | Dudley et al. | | |
| 5,588,237 A * | 12/1996 | Chase et al. | | 40/597 |
| 5,595,364 A * | 1/1997 | Protz, Jr. | | 248/205.5 |
| 5,630,517 A * | 5/1997 | Maznik | | 211/70.6 |
| 5,645,254 A * | 7/1997 | Ng et al. | | 248/206.2 |
| 5,673,884 A * | 10/1997 | Yemini | | 248/205.5 |
| D388,271 S | 12/1997 | Moore | | |
| D393,098 S | 3/1998 | Adams | | |
| 5,762,305 A | 6/1998 | Lee | | |
| D408,725 S * | 4/1999 | Adams | | D8/373 |
| 5,961,087 A | 10/1999 | Lee | | |
| 5,996,950 A * | 12/1999 | Richter | | 248/205.5 |
| 6,102,258 A * | 8/2000 | Riley et al. | | 222/538 |
| 6,131,865 A | 10/2000 | Adams | | |
| 6,142,432 A * | 11/2000 | Amussen | | 248/205.5 |
| 6,158,702 A * | 12/2000 | Kump | | 248/206.2 |
| 6,244,778 B1 * | 6/2001 | Chesbrough | | 403/51 |
| 6,308,923 B1 * | 10/2001 | Howard | | 248/205.5 |
| 6,375,143 B1 * | 4/2002 | Burns | | 248/363 |
| 6,402,104 B1 * | 6/2002 | Smith | | 248/205.5 |
| 6,609,689 B1 * | 8/2003 | Knapp | | 248/205.5 |
| 6,619,805 B1 * | 9/2003 | Roth | | 359/507 |
| 6,869,053 B2 * | 3/2005 | Adams, IV | | 248/206.2 |

\* cited by examiner

Figure 22

SLOTTED SUCTION CUP WITH TRANSVERSE BORE AND HOLDING DEVICE

CROSS REFERENCE TO RELATED APPLICATION

This application claims priority to co-pending U.S. patent application Ser. No. 09/851,639, filed May 9, 2001.

FIELD OF INVENTION

The invention relates to suction cups having attached hooks or rings.

BACKGROUND OF THE INVENTION

Most suction cups have a frustro conical cup portion from which a generally cylindrical head or neck extends. Some suction cups have a J-hook that extends from the cylindrical head. For example, U.S. Pat. No. 5,078,356 discloses a suction cup having an offset-mounted hook. In this device the suction cup has a cup-shaped base and cylindrical neck with a transverse circular bore. A hook has a straight cylindrical top that passes through the bore. A flat head on the top portion retains the hook in the neck of the suction cup. Because the bore and the top portion of the hook are cylindrical the hook is free to rotate within the bore. The hook may also move axially through the bore. The hook attached to some suction cups has a ring at one end. The ring fits over the cylindrical neck. These hooks can rotate around the neck. Another suction cup holder is disclosed in U.S. Pat. No. Des. 408,725. The suction cup in that holder has a cup-shaped base and a loop attached to the base. A hook is fitted through the loop. Yet another type of suction cup holder is disclosed in U.S. Pat. No. 1,859,893. The suction cup in that holder has a cylindrical bore through which a cylindrical rod passes. The ends of a U-shaped bail are attached to the ends of the rod. This type of configuration has also been used for towel holders in which a ring having a circular cross section passes through a cylindrical bore in the neck of the suction cup. In all of these holders the supporting ring or hook is made of metal or a plastic that is harder than the neck of the suction cup, which typically is vinyl. In the holder which has a ring passing through the suction cup the ring can be positioned so that the ring lies in a plane that is perpendicular to the wall on which the suction cup is mounted. If a towel is hung on the ring the ring will not remain in that plane but will be deflected downward.

Another type of suction cup holder has a U-shaped holding portion that is permanently attached to one or more suction cups in a manner that it will not move from a plane perpendicular to the wall on which the holder was mounted. Such a holder is disclosed in U.S. Pat. Nos. 2,502,714 and Des. 393,098. This type of suction cup requires a larger package than the suction cup with a ring that can be moved from a position in a plane perpendicular to the wall on which the holder was mounted to a plane parallel to that wall.

Yet another type of suction cup has a slot through the head or neck that divides the head into two spaced apart legs. Objects are held between the spaced apart legs. Such a suction cup is disclosed in U.S. Pat. No. 5,402,974 to Adams and U.S. Pat. No. 4,588,153 to Boston et al.

U.S. Published application Ser. No. 2001/0040202 discloses a holder for a razor or similarly shaped article that has a suction cup and a split ring or a stem held within at least one bore through the neck of the suction cup. The bore and the ends of the split ring or stem have a multi-sided, preferably a square, cross section. Each side aligns with and is opposite a side of the bore keeping the split ring or stem in a selected position relative to the suction cup. When a square bore is used, the ring can be rotated 90 degrees within the bore from a plane parallel to a wall on which the suction cup could be mounted to a plane perpendicular to that wall. When a razor is placed within the ring while the ring is perpendicular to the wall, the ring will not be deflected downward. To connect the ring to the suction cup, the end of the split ring must be pulled apart.

There is a need for a suction cup with a hook or other holding device that will remain in a selected position. The hook must not freely rotate around an axis through the hook and not move around the head or neck of the suction cup.

SUMMARY OF THE INVENTION

I provide a suction cup having a cup portion, which is generally concave-convex in shape having a concave inner surface for engagement with and affixation to the receiving surface, and a convex outer surface facing opposite to the inner surface. A generally cylindrical neck portion is integral with and extends outwardly from the cup portion outer surface. The neck portion is formed of a pair of legs separated by a slot opening to an exposed end of the neck portion. The neck portion also has a transverse bore passing through the legs along an axis that intersects the slot. Preferably the axis is normal to the slot.

I also prefer to provide a hook having a curved portion, a straight portion extending from the curved portion and a cross member attached to the straight portion. The hook is positioned so that at least part of the straight portion is within the slot of the suction cup and at least part of the cross member is within the bore.

I further prefer that the bore have a multisided cross-section and the cross member of the hook have a multisided cross-section complementary to the bore. The cross member is fitted within the bore so that the hook can be rotated within the bore from a first position to a second position such that in each position every side of the cross member of the hook is opposite a side of the bore. The hook may be a J-hook, eye hook, U-shaped hook or any other shape that can hold an object.

I also prefer to provide a rack having two or more hooks extending from one side of an elongated member. Two legs extend from the opposite side. A cross member extends from each leg. Two slotted suction cups each having a transverse bore are provided. One leg of the rack is placed in the slot of the first slotted suction cup, while the cross member fits within the transverse bore. The second leg is similarly attached to the second suction cup.

The suction cup is an otherwise conventional suction cup made of a soft vinyl. The hook is made of a harder plastic such as polypropylene or polycarbonate. When a square bore is used the hook can be rotated 90 degrees within the bore from a plane parallel to a wall on which the suction cup could be mounted to a plane perpendicular to that wall. When a relatively light object such as a razor or key chain is placed on the hook, the hook will not be deflected downward. The hook may also be used for a toothbrush and similarly shaped objects as well as for signs or tags.

Other objects and advantages of the suction cup with slot and transverse bore and holding device will become apparent from a description of a present preferred embodiment shown in the drawings.

DESCRIPTION OF THE PREFERRED EMBODIMENTS

Figure 1:
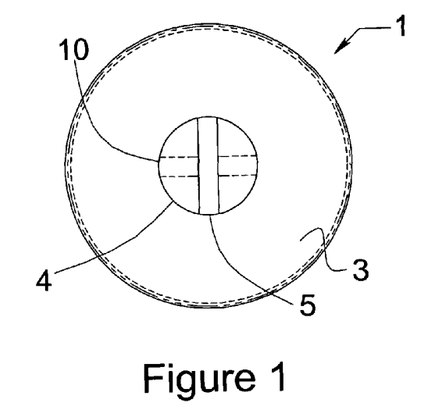
FIG. 1 is a top plan view of a present preferred embodiment of my slotted suction cup with transverse bore.
Figure 2:
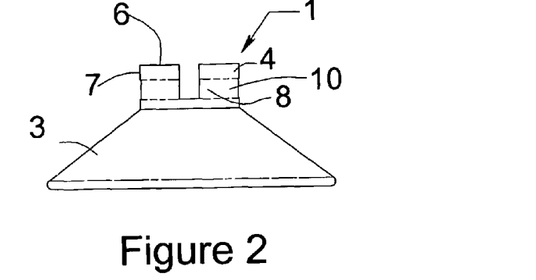
FIG. 2 is a side view of the suction cup shown in FIG. 1.
Figure 3:
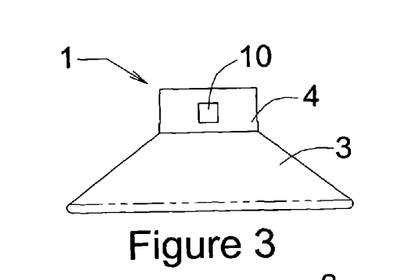
FIG. 3 is a side view of the suction cup shown in FIGS. 1 and 2 rotated 90° from the position shown in FIG. 2.

As shown in FIGS. 1, 2 and 3, the present preferred embodiment of my slotted suction cup 1 with transverse bore has a cup portion or base 3 and a cylindrical neck 4. A transverse slit opening or slot 5 open to the top surface or exposed end 6 of the neck 4 extends across the neck forming two spaced apart legs 7, 8. The slot 5 preferably has two parallel walls and a flat base. If desired, the wall could be tapered and the base could be concave. A transverse bore 10 passes through the legs along an axis that intersects the slot. Preferably the axis is normal to the slot. The bore 10 preferably has a square cross section. However, the cross-section of the bore could be a star, pentagon, octagon or other polygon.

Figure 4:
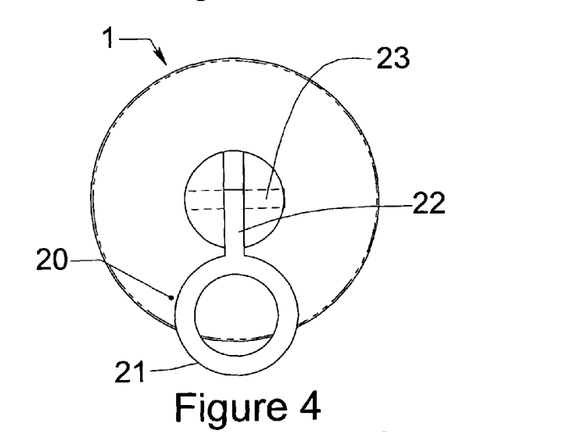
FIG. 4 is a top plan view of the suction cup shown in FIGS. 1 through 3 holding an eye-hook in a first position parallel to a surface on which the suction cup is mounted.
Figure 5:
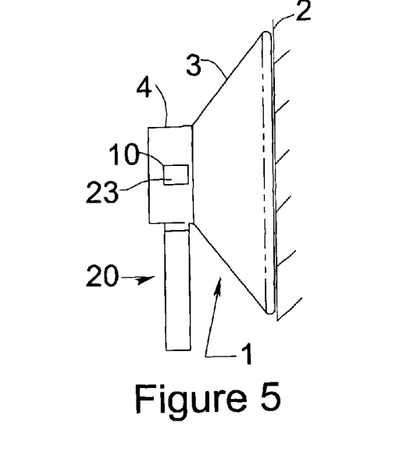
FIG. 5 is a side view of the suction cup with eye-hook shown in FIG. 4.
Figure 6:
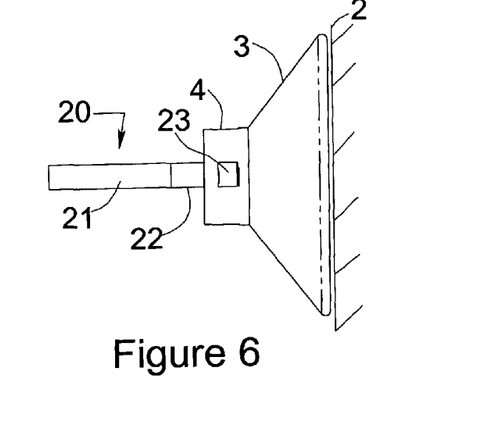
FIG. 6 is a side view similar to FIG. 5 with the eye-hook in a second position normal to the surface on which the suction cup is mounted.

Referring to the embodiment shown in FIGS. 4, 5 and 6, I provide an eye-hook 20 having a ring or eye portion 21 that is attached to a straight portion 22. A cross member 23 extends from the end of the straight portion of the eye-hook and has a cross-section corresponding to the cross-section of the bore 10, which is a square. The cross member 23 is sized to fit within the transverse bore 10 in the neck 4 of the suction cup 1. When the cross member 23 is within the bore 10 one side of the cross member is opposite each side of the bore 10. While I prefer that the cross-section of the cross member be the same as the cross-section of the bore, that is not necessary for the shape of the cross-section to be considered as corresponding to the cross section of the bore. For example, the square cross member 23 could be held in a bore having a cross section of an eight pointed star. Each corner of the square would be in one of four points of the star and one side of the cross member would be opposite one side of the bore even though the cross member is not within four points of the eight pointed star.

The suction cup 1 is an otherwise conventional suction cup made of a soft vinyl. The neck of the suction cup may have a circular cross-section as shown or may be square, hexagonal oval or other shape that creates a generally cylindrical structure. The eye-hook 20 is made of a harder plastic such as polypropylene or polycarbonate. Consequently, the hook 20 can be rotated 90 degrees within the square bore from a position parallel to the surface 2 on which the suction cup is mounted, shown in FIG. 5 to a position normal to that surface 2 as shown in FIG. 6. When the hook is in either of these two positions every side of cross member 23 is opposite a side of the bore 10. When an object (not shown) is placed on the hook 20 oriented as shown in FIG. 6, the weight of the object will tend to push the ring downward. If the object is not too heavy, the square shape of the bore and the cross member of the hook, will resist the downward force of the object and the hook will not be deflected downward.

Although I prefer that the bore 10 and the cross member 23 have a square cross section, other multi-sided cross-sections could be used. A star, hexagon and octagon would permit the hook to be positioned as shown in FIGS. 5 and 6. A pentagon may also be acceptable. Whatever shape is chosen, the hook would be held in positions in which each side of the cross member 23 is opposite a side of the bore 10 as can be seen in FIGS. 5 and 6. If a shape having more than four sides is selected it likely would be necessary to use a harder material for the neck of the suction cup than is needed for a four-sided or three-sided bore so that the hook does not slip from the desired position when an object is placed on the hook.

Figure 7:
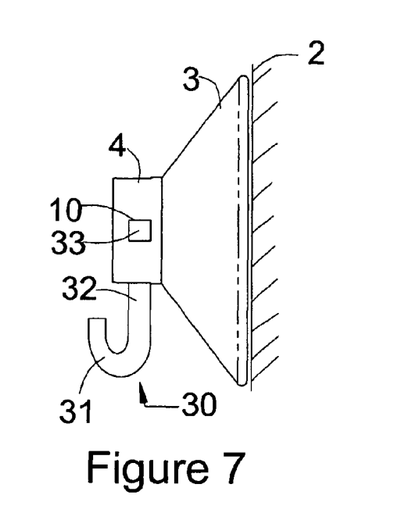
FIG. 7 is a side view of the suction cup shown in FIGS. 1 through 3 holding a J-hook in a first position parallel to a surface on which the suction cup is mounted.
Figure 8:
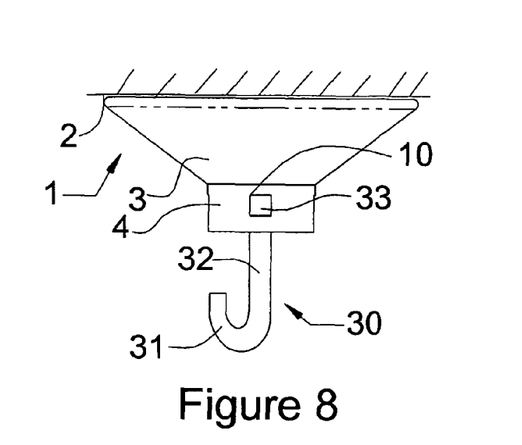
FIG. 8 is a side view of the suction cup and eye-hook shown in FIG. 7 with the eye-hook in a second position normal to the surface on which the suction cup is mounted.

Other types of hooks could be used in place of the eye-hook. In a second present preferred embodiment shown in FIGS. 7 and 8, I use the same suction cup 1 but provide a J-hook 30. The J-hook has a straight section 32 with curved portion 31 at one end. A cross member 33 having a square cross-section is attached to the opposite end of the straight member and is within the square bore 10. This J-hook can be positioned as the eye-hook was positioned in FIGS. 5 and 6.

Figure 9:
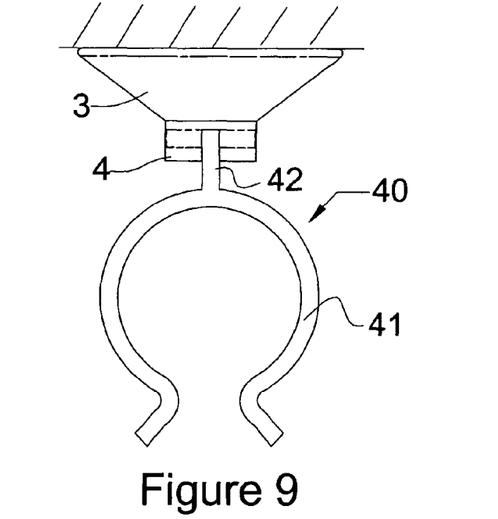
FIG. 9 is side view of the suction cup shown in FIGS. 1 through 3 holding a U-shaped hook in a first position normal to a surface on which the suction cup is mounted.
Figure 10:
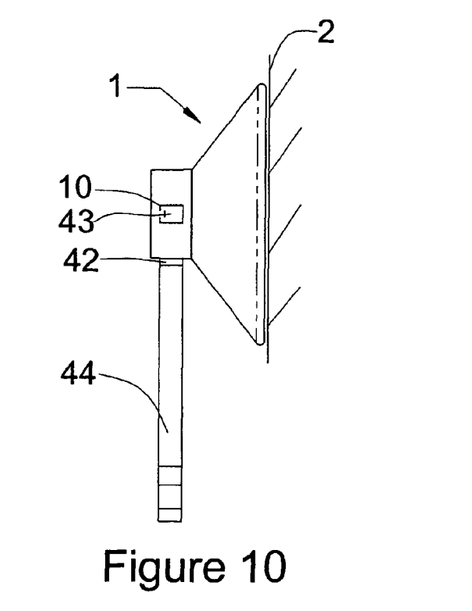
FIG. 10 is a side view of the suction cup and U-shaped hook shown in FIG. 9 with the U-shaped-hook in a second position parallel to the surface on which the suction cup is mounted.

One could also provide a hook 40 having a U-shaped receiving end 41 as shown in FIGS. 9 and 10. This hook also has straight portion 42 extending from the U-shaped receiving end 41. Cross member 43 having a square cross-section is attached to the opposite end of the straight portion 42 and is within the square bore 10.

Figure 11:
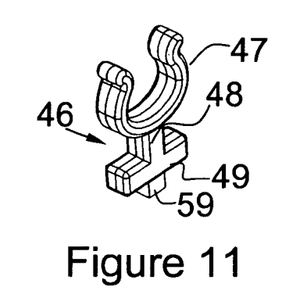
FIG. 11 is a perspective view of another U-shaped hook that can be used in the slotted suction cup with a transverse bore.
Figure 12:
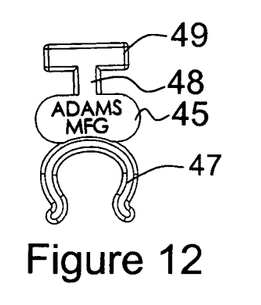
FIG. 12 is a top plan view of yet another U-shaped hook that can be used in the slotted suction cup with a transverse bore.

Another U-shaped hook 46 is shown in FIG. 11. This hook also has a U-shaped receiving end 47, straight portion 48 and cross member 49. The straight portion 48 fits within the slot of the suction cup while the cross member fits within the square bore. This holder also has a projection 59 that extends beyond the cross member 49. If this holder 46 is used, I prefer to provide a recess having the same cross-sectional shape as the projection in the base of the slot of the suction cup. That recess is located so that when the holder 46 is positioned relative to the suction cup as holder 40 is with respect to the suction cup shown in FIG. 9, the projection 59 would be within the recess. Because the suction cup is vinyl the area around the recess would flex as the holder 46 is rotated by the user allowing the projection to enter and leave the recess. Yet, the engagement between the projection 59 and recess would enable the holder to support more weight without moving than a comparable holder having no projection, such as the holder shown in FIG. 12. This holder can be modified to have no projection and to have a flat portion 45 extending from the straight portion 48 as shown in FIG. 12. It should be apparent from FIGS. 11 and 12 that the projection could be oriented to extend from the cross member in a direction offset from the position shown in FIG. 11 by 90°. When the holder is so located the projection would rest against the bottom surface of the slot when the holder is positioned as holder 40 in FIG. 9.

Figure 13:
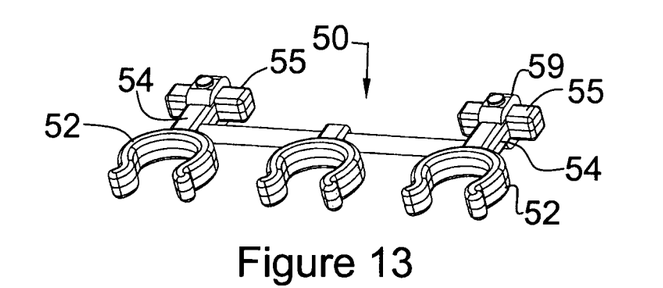
FIG. 13 is a perspective view of a rack having three U-shaped hooks that can be attached to two slotted suction cups with transverse bores.
Figure 14:
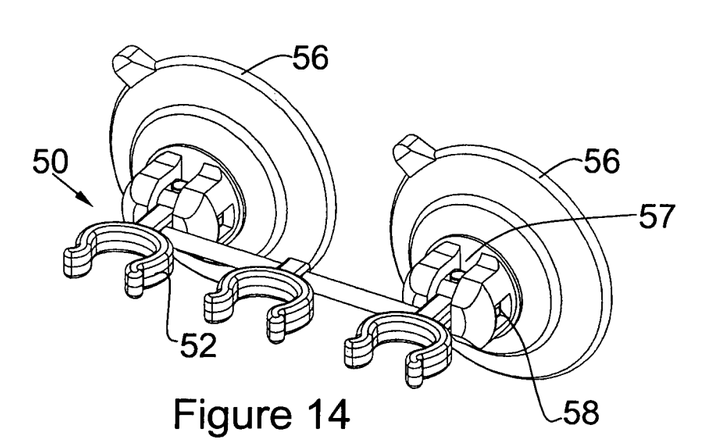
FIG. 14 is a perspective view of the rack shown in FIG. 13 attached to two slotted suction cups with transverse bores.

Referring to FIGS. 13 and 14 another holder that can be used in the slotted suction cup with transverse bore is a rack 50 having three U-shaped clips 52 extending from one side of an elongated body or cross bar 53. A pair of legs 54 extends from either end of the cross bar 53 in a direction opposite from the clips 52. A cross member 55 is provided on each leg. A pair of suction cups 56 is provided to hold the rack 50. Each leg 54 fits in the slot 57 of a suction cup 56 while the cross member 55 is within the transverse bore 58. A projection 59 or series of projections are provided on the cross members 55. These projections extend from three of the four sides of the cross member 55 at the location of the leg 54. These projections would depress the bottom surface of the suction cup whenever the rack is in the position shown in FIG. 14 or rotated 90° in either direction from that position. The projection 59 increases the friction between the slot bottom of the suction cup and the cross member enabling the rack to support more weight than a comparable rack having no projections. Similar projections could be provided on any of the hooks and holders disclosed and illustrated herein. It should be apparent that one could provide a rack or cross bar 53 without clips, or with other types of holders. Moreover, cross bar 53 could be a planar shape and have indicia on either or both planar surfaces. One surface may say "OPEN" and the opposite side may say "CLOSED" enabling the product to be used by store keepers to indicate whether they are open for business.

Figures 15, 16:
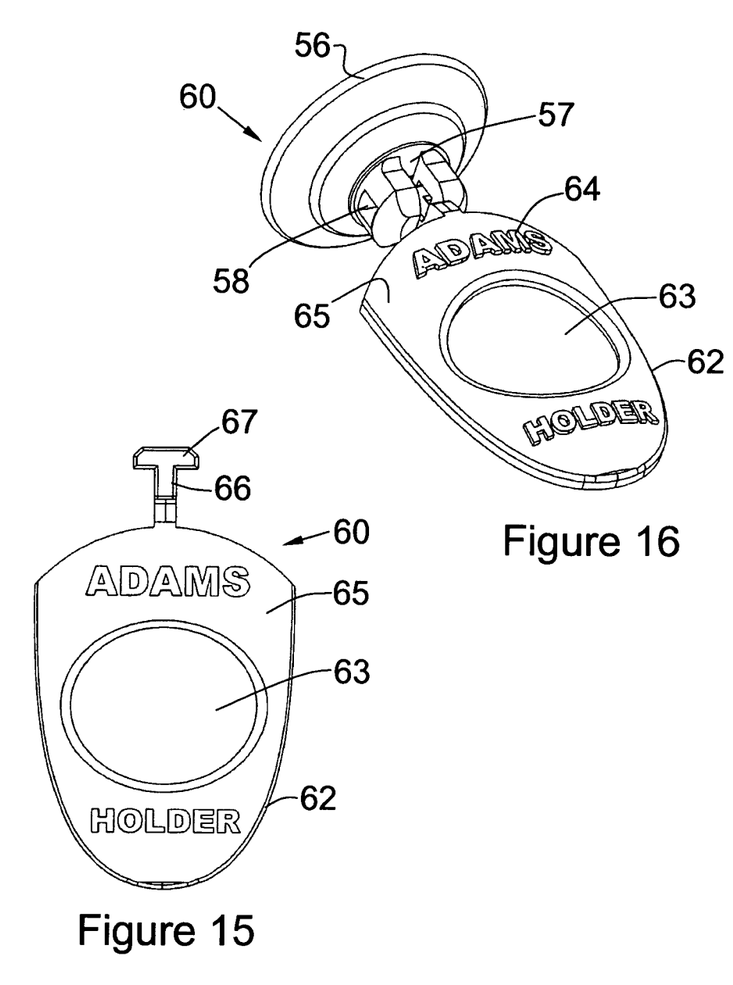
FIG. 15 is a top plan view of another present preferred holder that can be used in the slotted suction cup with a transverse bore.
FIG. 16 is a perspective view of the holder shown in FIG. 15 attached to the slotted suction cup with a transverse bore.
Figures 17, 18, 19:
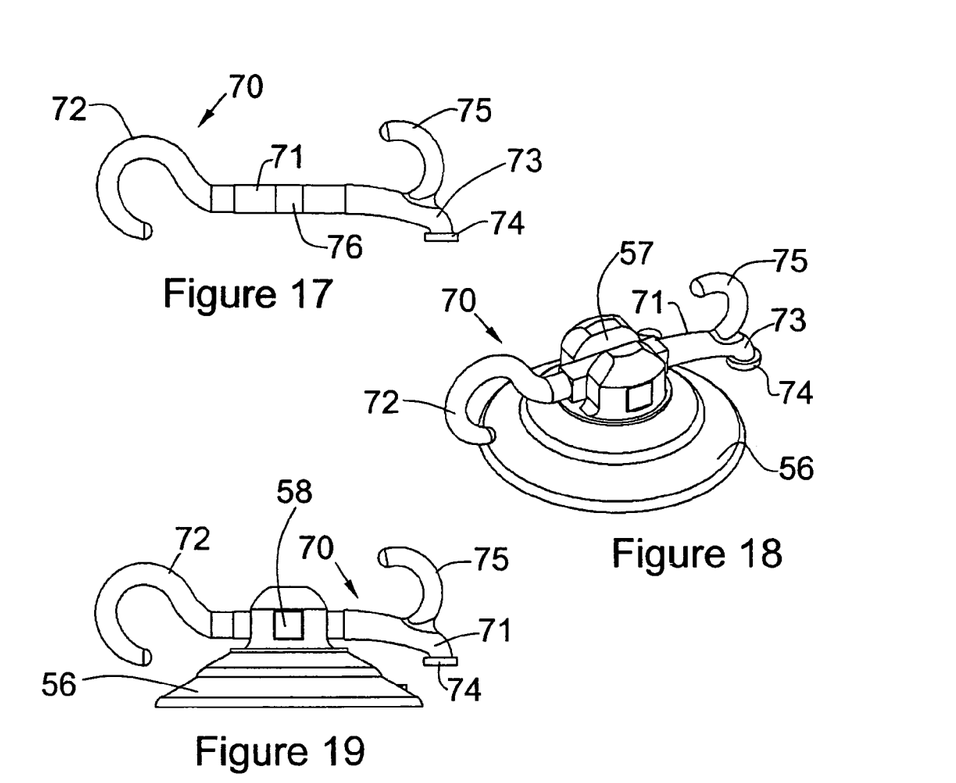
FIG. 17 is a side view of another holder that can be used in the slotted suction cup with a transverse bore.
FIG. 18 is a perspective view of the holder shown in FIG. 17 in the slotted suction cup with a transverse bore.
FIG. 19 is a side view of the embodiment shown in FIG. 18.

Yet another type of holder that can be used in the slotted suction cup having a transverse bore is shown in FIGS. 15 and 16. This holder 60 has a planar receiving portion 62 with a central bore 63. The bore may be sized to receive the handle of a razor or toothbrush. Indicia 64 can be provided on the top surface 65 of the holder. A straight portion 66 extends from the planar portion to cross member 67. The straight portion fits within the slot 57 of the suction cup 56 and the cross member 67 fits into the square bore 58. The top surface 65 may be flat or curved.

Figure 20:
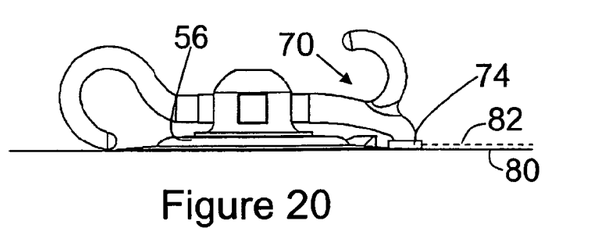
FIG. 20 is a side view similar to FIG. 19 showing the suction cup pressed against a flat surface.

In yet another embodiment shown in FIGS. 17 through 20 the holder 70 has an elongated central portion 71 that fits within the slot 57 of the suction cup 56. Cross member 76 extends from the elongated central portion and fits within the square bore 58 of the suction cup. The central portion 71 extends beyond the slot and terminates in a J-hook 72 at one end. The opposite end has a curved portion 73 that is turned toward the cup portion and has an enlarged circular head 74. An optional curved hook 75 extends in an opposite direction away from the cup portion. The holder is sized so that when the suction is pressed against a smooth flat surface 80 as shown in FIG. 20 the head 74 of the curved portion 73 will press against the flat surface. Therefore, a sign or other object 82 shown in chain line may be held under the head 74. Preferably, the curved end is able to flex away from the object when the suction cup is pressed against the flat surface. Being flexible will allow several sheets of paper or objects of comparable thickness to be held. Typically holder 70 would be made of a hard plastic such as polycarbonate or polypropylene. To increase the friction between the head 74 and the sign 82, one could apply a low tack adhesive onto head 74 or provide a vinyl cap or other soft plastic cover over head 74. Another alternative is to mold the holder 70 of two different materials, the head being vinyl or other soft material and the remainder of the holder being polypropylene, polycarbonate or other hard plastic.

Figure 21:
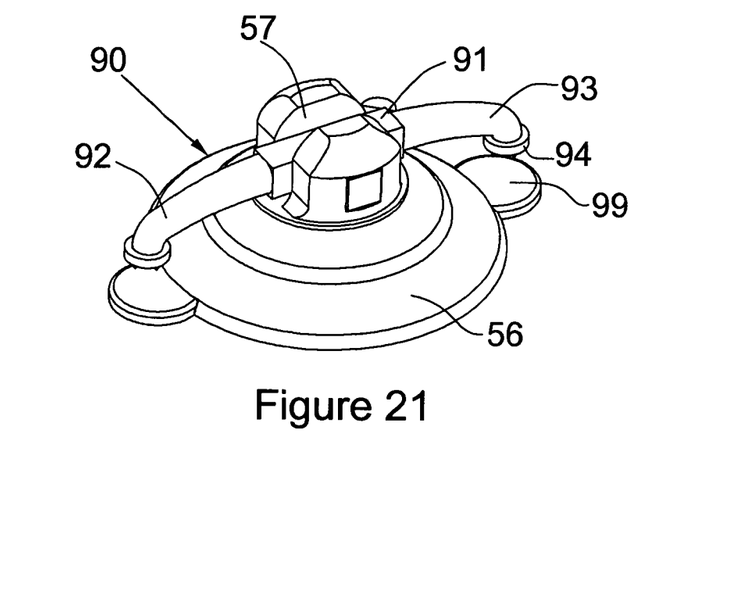
FIG. 21 is a perspective view of another present preferred holder in the slotted suction cup with transverse bore.
Figure 22:
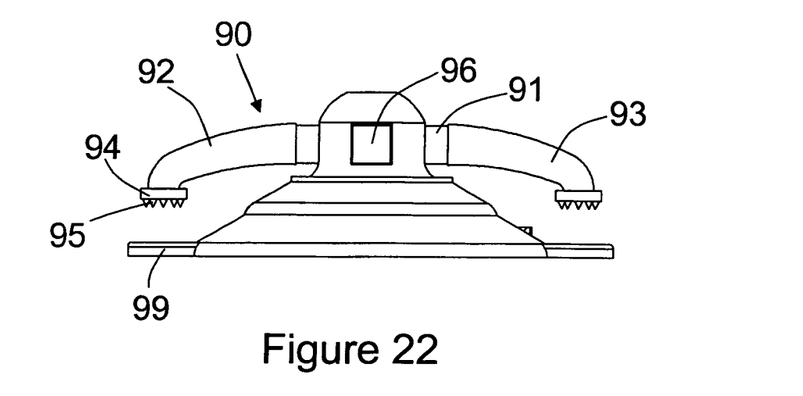
FIG. 22 is a side view of the embodiment shown in FIG. 21.

A similar holder 90 having an elongated central body 91 that fits within the slot 57 of the suction cup 56 is shown in FIGS. 21 and 22. This holder has curved portions 92 and 93 that extend from either side of the elongated central body 91 toward the cup portion of the suction cup. If desired, the elongated central body and curved end portions may be configured together to form a shallow arch. A head 94 having prongs or teeth 95 is provided on each curved portion 92, 93. The heads 94 are positioned over landings 99 that extend from the cup portion of the suction cup 56. A cross member 96 extends from the central portion 91 and fits within the square bore of the suction cup. When the suction cup is pressed against a flat surface the head 94 will move toward the landings 99. Consequently, paper or other objects can be held between the head and the landing. The holder 70 is preferably made of plastic such that the curved ends 92, 93 of the holder can flex. Consequently, when the suction cup is pressed against and attached to a flat surface as the suction cup shown in FIG. 20, the cup will be exerting a force on the holder 90 in a direction toward the surface. That force combined with the force exerted by the flexed end seeking to return to its original unflexed position will hold any object placed under the head 94 in place.

The shape of the hook is not limited to the hooks showing in the drawings. The end of the hook may be threaded or any other shape configured to receive and hold an object. Any configuration that is capable of holding an object and fits into the slotted suction cup with transverse bore should be considered to be a hook as that term is used herein.

For shipment the hook is positioned parallel to a surface on which the hook will be placed as shown in FIGS. 4, 5, 7 and 9. The hook may be used in the as-shipped position, or turned to the position shown in FIGS. 6, 8 and 10.

When an article is hung on the hook any force acting on an end of the article may cause the article to swing. That force could be translated to the hook. If the hook had no cross member hook would rotate around an axis through the straight portion of the hook. However, the cross member of the hook prevents rotation about an axis through the straight portion of the hook. The square cross-section of the cross member resists rotation of the hook about an axis through the cross member.

Another advantage of the present slotted suction cup with transverse bore is that a hook may be easily inserted into the neck of the suction cup. One squeezes the cup portion to move the upper ends of the legs 7 and 8 away from one another. Insertion is made by positioning the hook at an angle relative to the slot and the bore. One end of the cross member is placed within the opened slot so as to be opposite the bore in one of the legs 7. That end of the cross member is pushed into the bore in leg 7. The flexure of the suction cup that opened the slot enables the opposite end of the cross member to slide along the wall of the slot on leg 8 and into the bore 10 in that leg 8. Then the suction cup is released allowing the legs to return to their original position.

In the present preferred embodiments the bore intersects the slot at a right angle and the cross member is perpendicular to the straight portion of the hook. However, these angles could be greater or lesser than 90°. To be able to rotate the hook around an axis through the cross member, the angles must be close to 90°. However, if rotation is not desired then a much different angle may be provided. Whatever angle is used, the hook can be inserted into the suction cup by flexing the suction cup as here described.

Also in the present preferred embodiments the transverse bore is near the bottom surface of the slot. While this configuration is preferred, it is not required. The bore may be spaced away from the bottom of the slot. Such spacing may enable a projection from the cross member to easily pass over the bottom surface of the slot as the holder is rotated.

Although I have shown certain present preferred embodiments of my slotted suction cup with transverse bore it should be distinctly understood that the invention is not limited thereto, but may be variously embodied within the scope of the following claims.

I claim:

1. A suction cup comprising:
    a cup portion being generally concave-convex in shape having a concave inner surface for engagement with and affixation to a receiving surface, and a convex outer surface facing opposite to the inner surface;
    a generally cylindrical neck being integral with and extending outwardly from the cup portion outer surface, the neck being formed of a pair of legs separated by a slot opening to an exposed end of the neck, the neck having a transverse bore passing through the legs along an axis that intersects the slot; and
    a hook, the hook comprised of a curved portion, a straight portion extending from the curved portion and a cross member attached to the straight portion, the hook positioned so that at least part of the straight portion is within the slot of the suction cup and at least part of the cross member is within the bore.

2. The suction cup of claim 1 wherein the axis is normal to the slot.

3. The suction cup of claim 1 wherein the bore has a multi-sided cross section.

4. The suction cup of claim 3 wherein the multisided cross-section is square, star, triangular, hexagonal or octagonal.

5. The suction cup of claim 1 wherein the suction cup is made of soft vinyl.

6. The suction cup of claim 1 wherein the bore has a multisided cross-section and the cross member of the hook has a multisided cross-section complementary to the bore, said cross member fitted within the bore so that the hook can be rotated within the bore from a first position to a second position such that in each position every side of the cross member of the hook is opposite a side of the bore.

7. The suction cup of claim 1 wherein the hook is one of an eye-hook and a J-hook.

8. The suction cup of claim 1 wherein the cup portion and neck are vinyl and the hook is polypropylene or polycarbonate.

9. The suction cup of claim 1 wherein the cross member of the hook is perpendicular to the straight portion of the hook.

10. The suction cup of claim 1 wherein the curved portion of the hook is U-shaped.

11. The suction cup of claim 1 also comprising at least one projection extending from the cross-member.

* * * * *